United States Patent
Yamamoto (10) Patent No.: US 6,571,631 B1
(45) Date of Patent: Jun. 3, 2003

(54) DISPLACEMENT SENSOR AND MOVEMENT INFORMATION COLLECTING DEVICE COMPRISING THE SAME

(75) Inventor: Hiroyasu Yamamoto, Minato-ku (JP)

(73) Assignee: FDK Corporation, Tokyo (JP)

( * ) Notice: Subject to any disclaimer, the term of this patent is extended or adjusted under 35 U.S.C. 154(b) by 0 days.

(21) Appl. No.: 09/673,182

(22) PCT Filed: Feb. 14, 2000

(86) PCT No.: PCT/JP00/00783

§ 371 (c)(1),
(2), (4) Date: Oct. 12, 2000

(87) PCT Pub. No.: WO00/54060

PCT Pub. Date: Sep. 14, 2000

(30) Foreign Application Priority Data

Mar. 5, 1999 (JP) ........................................... 11-058404
Mar. 5, 1999 (JP) ........................................... 11-058406

(51) Int. Cl.$^7$ ............................................. G01P 15/13
(52) U.S. Cl. ................................. 73/514.17; 73/862.61
(58) Field of Search ........................ 73/514.17, 514.21, 73/514.24, 514.31, 514.02, 510, 862.61

(56) References Cited

U.S. PATENT DOCUMENTS

| 3,491,600 A | * | 1/1970 | Kasparian | ................ | 73/514.17 |
|---|---|---|---|---|---|
| 3,508,445 A | | 4/1970 | Penney, Jr. et al. | ...... | 73/514.12 |
| 4,891,983 A | | 1/1990 | Stewart | .................... | 73/514.17 |
| 5,789,677 A | | 8/1998 | McEachern | .............. | 73/514.17 |

FOREIGN PATENT DOCUMENTS

| JP | 8-43113 | 2/1996 |
|---|---|---|
| JP | 8-248059 | 9/1996 |

* cited by examiner

Primary Examiner—John E. Chapman
(74) Attorney, Agent, or Firm—Wenderoth, Lind & Ponack, L.L.P.

(57) ABSTRACT

There is provided a displacement sensor including a moving member composed of a magnetic body; a pair of stators each composed of a magnetic body and arranged opposed to each other with respect to the moving member, the stators including driving coils and position detectors corresponding to the driving coils, respectively; and a control unit for driving, based on a detection output coming from the position detectors, the driving coils with an electric power corresponding to intervals between the moving member and the stators so that the moving member is balanced at an intermediate position between the stators and for computing a force or acceleration applied to the moving member with a driving electric power of the driving coils. A mobile data collecting apparatus utilizing the displacement sensor is also disclosed.

7 Claims, 8 Drawing Sheets

DISPLACEMENT SENSOR AND MOVEMENT INFORMATION COLLECTING DEVICE COMPRISING THE SAME

TECHNICAL FIELD

This invention relates to a displacement sensor composed of a force sensor, an acceleration sensor or the like, which is capable of performing a precision measurement, and a mobile data collecting apparatus suited to be used for, among others, an on-vehicle navigation system utilizing the displacement sensor.

BACKGROUND ART

Displacement sensors of this type have heretofore been known. For example, Japanese Patent Publication (Unexamined) No. 8-248059 discloses a three-dimensional acceleration sensor comprising a weight part and detection parts arranged point-symmetrically at positions equidistantly away in a three-dimensional direction from the center of gravity of the weight part, a three-dimensional acceleration applied to the weight part being detected by the detectors.

The above-mentioned publication discloses sensors of the following types. The first one is of the type in which a piezoelectric element is utilized in a detection part and an acceleration applied in various directions by an adjustment torque screw for clamping or sandwiching a weight part with a constant pressure is detected as an analogous variation in voltage by the piezoelectric element (piezoelectric type acceleration sensor). The second one is of the type in which a magnetic sensor is utilized in a detection part and which includes an electromagnet with the magnetic sensor fixed thereto and a control unit module for it. An amount of displacement of the magnetic body is detected as the variations in magnetic field by the magnetic sensor. Then, the amount of displacement is pulse-width modulated so as to be fed back to the electromagnet and the pulse-width modulation is monitored to detect an acceleration (electromagnetic type acceleration sensor). The third one is of the type which includes a weight part having a magnet of magnetic characteristics, serving as an inertial body and in which a detection part includes magnets three-dimensionally opposedly arranged in an inner surface of a case and a magnetic coil module. With the weight part kept floated within the case under the effect of magnetic suspension from six directions caused by the magnets and the magnetic coil module, the variations in magnetic flux caused by positional change of the weight part are converted into an electric signal and detected as an acceleration (magnet type sensor).

However, the above-mentioned techniques have the following shortcomings.

In the case where a sensing part (weight part) of an acceleration sensor contacts a separate substance (detection part) as in the case with the piezoelectric type acceleration sensor, mechanical errors caused by frictional force thereof are liable to occur.

Even in the structure in which the weight part is balanced in a hollow interior as in the case with the electromagnetic type speed sensor, modulation errors and conversion errors during the pulse-width/electric power conversion are liable to occur because the controlling of the electric power supplied to the electromagnetic coil is performed by means of pulsewidth modulation. This makes it difficult to obtain a precision detection.

Moreover, in any one of the above-mentioned types, there is not only a need of analog processing, such as synchronous rectification and smoothing, amplification, integration and the like but also a need of A/D conversion, for detection of an acceleration. Consequently, it is difficult to obtain more than a certain degree of accuracy because of its nonlinearity. Moreover, the circuitry becomes large and the cost is increased. In addition, operation tends to be unstable because it is susceptible to the fluctuations in temperature and power supply.

The present invention has been accomplished in view of the abovementioned shortcomings. It is, therefore, a technical problem to be solved by the present invention to provide a displacement sensor which is precise and inexpensive.

Mobile data collecting apparatuses of the above-mentioned type have heretofore been known, as well. A typical example is disclosed in Japanese Patent Publication (Unexamined) No. 8-43113, in which an absolute position is detected utilizing radio waves from a GPS (Global Positioning System). Another example is disclosed in Japanese Patent Publication (Unexamined) No. 8-297033, in which a position on the ground is computed utilizing a combination of various kinds of sensors (an acceleration sensor, an angular acceleration sensor and an inclination sensor).

However, the former has such shortcomings that it becomes unable to be used in a tunnel, under an elevated railroad and in a room because it uses radio waves coming from an artificial satellite. On the other hand, the latter has such shortcomings that big errors occur depending on accuracy of the sensors and the positions where they are attached, the number of component parts of the sensors and the circuits are increased and therefore, the cost is inevitably increased.

In view of the above situation, it is, therefore, another technical problem to be solved by the present invention to provide a mobile data collecting apparatus which can be used even in a place where radio waves coming from an artificial satellite do not reach, in which errors are lessened and which is inexpensive.

DISCLOSURE OF INVENTION

As mentioned above, the present invention has been accomplished in view of the shortcomings inherent in the prior art. It is, therefore, an object of the present invention to provide a displacement sensor which is precise and inexpensive and a mobile data collecting apparatus which can be used even in a place where radio waves coming from an artificial satellite do not reach, in which errors are lessened and which is inexpensive.

In a first embodiment of the present invention, a displacement sensor includes a moving member (10) composed of a magnetic material; a pair of stators (11, 12) each composed of a magnetic material and arranged opposed to each other with respect to the moving member (10), the stators (11,12) including driving coils (13, 14) and position detectors (15, 16) corresponding to the driving coils (13, 14), respectively; and a control unit (30) for driving, based on a detection output coming from the position detectors (15, 16), the driving coils (13,14) with an electric power corresponding to intervals (d1, d2) between the moving member (10) and the stators (11, 12) so that the moving member (10) is balanced at an intermediate position between the stators (11, 12) and for computing a force (F) or acceleration (G) applied to the moving member (10) with a driving electric power of the driving coils (13, 14).

In a second embodiment of the present invention, one pair or more of the stators (11, 12) are disposed opposed to each other on each plane of the moving member (10) in triaxial directions X, Y, Z.

In a third embodiment of the present invention, a displacement sensor includes a spherical moving member (10) composed of a magnetic material; three pairs of stators (11, 12) each composed of a magnetic material and arranged opposed to each other in triaxial directions X, Y, Z, with respect to the moving member (10), the stators (11, 12) including driving coils (13, 14) and position detectors (15, 16) corresponding to the driving coils (13, 14), respectively; and a control unit (30) for driving, based on a detection output coming from the position detectors (15, 16), the driving coils (13,14) with an electric power corresponding to intervals (d1, d2) between the moving member (10) and the stators (11, 12) so that the moving member (10) is balanced at an intermediate position between the stators (11,12) and for computing a force (F) or acceleration (G) applied to the moving member (10) with a driving electric power of the driving coils (13, 14).

In a fourth embodiment of the present invention, a shield (23) composed of a non-magnetic body is interposed between and adjacent to the stators on the X-, Y- and Z-axis.

In a fifth embodiment of the present invention, the driving of the driving coils (13,14) is a pulse driving having a constant pulse-width and a driving electric power is computed based on the number of the pulse driving signal.

In a sixth embodiment of the present invention, the control unit (30) includes a phase comparator circuit (31) for supplying a comparing signal. (Clock) to the paired position detectors (15, 16) and detecting an unbalance of the intervals (d1, d2) between the paired stators (11,12) and the moving member (10) as a difference in phase of the comparing signal (Clock); a pulse generating circuit (32) for supplying a driving pulse (P0, P1) of a constant pulse-width to one of the driving coils (13,14) in accordance with the detected phase difference; a driver circuit (33) for driving the driving coils (13,14) with the driving pulse (P0, P1); a counter circuit (34) for counting the number of the driving pulses (P0, P1); and computing or processing means (40) for computing a force (F) or acceleration .(G) applied to the moving member (10) based on a counted value of the counter circuit (34).

In a seventh embodiment of the present invention, the computing means (40) computes a force (F) applied to the moving member (10) per axis by using an equation of $F =K1 \cdot N1 - K2 \cdot N2$, where N1, N2 represent count numbers of the driving pulses (P0, P1) supplied to the paired driving coils (13, 14) on one axis and K1, K2 represent force coefficients.

In an eighth embodiment of the present invention, the computing means (40) computes an acceleration (G) applied to the moving member (10) per axis using an equation of $G=K10 \cdot N1 - K20 \cdot N2$, where N1, N2 represent count numbers of the driving pulses (P0, P1) supplied to the paired driving coils (13, 14) on one axis and K10, K20 represent acceleration coefficients thereof.

In a ninth embodiment of the present invention, the control unit (30) includes a temperature sensor and makes a correction of the computation of the computing means (40) based on a detection output thereof.

In a tenth embodiment of the present invention, the position detectors (15,16) are converters utilizing the variations in inductance or in electrostatic capacity.

In an eleventh embodiment of the present invention, a mobile data collecting apparatus comprises a hexahedral frame (62) composed of a non-magnetic material; a rectangular parallelepiped moving member (10) composed of a magnetic material, the moving member (10) being loosely fitted so that the moving member (10) can vibrate in a three-dimensional direction within the frame; two pairs of stators (4, 5, 6, 7, 8, 9) each composed of a magnetic body, the two pairs of stators (4, 5, 6, 7, 8, 9) being arranged opposed to each other with the moving member sandwiched therebetween; two pairs of stators (4, 5, 6, 7, 8, 9) each composed of a magnetic body, the two pairs of stators (4, 5, 6, 7, 8, 9) being arranged opposed to each other on three sets of opposed surfaces (62a, 62b, 62c, 62d, 62e, 62f) of the frame with the moving member sandwiched therebetween; the stators being arranged such that three kinds of connecting lines (L1, L2, L3) thereof are orthogonal to each other; a driving coil (13) attached to each of the stators and adapted to vibrate the moving member; a position detecting coil (15) attached to each of the stators and adapted to detect the position of the moving member; moving member control means (63) for driving the driving coils in response to the signal from each of the position detecting coils (15) so that the moving member is located in the center of the frame; acceleration computing means (64) for computing an acceleration of the moving member based on a driving electric power of each of the driving coils; and mobile data computing means (65) for computing a mobile data based on the acceleration computed by the acceleration computing means. By employing this constitution, various mobile data can be obtained from an acceleration of the moving member and without a need for radio waves coming from an artificial satellite.

In a twelfth embodiment of the present invention, a mobile data collecting apparatus comprises a hexahedral frame (62) composed of a non-magnetic body; a rectangular parallelepiped moving member (10) composed of a magnetic body, the moving member (10) being loosely fitted so that the moving member (10) can vibrate in a three-dimensional direction within the frame; two pairs of stators (4, 5, 6, 7, 8, 9) each composed of a magnetic material, the two pairs of stators (4, 5, 6, 7, 8, 9) being arranged opposed to each other on three sets of opposed surfaces (62a, 62b, 62c, 62d, 62e, 62f) of the frame with the moving member sandwiched therebetween; the stators being arranged such that three kinds of connecting lines (L1, L2, L3) thereof are orthogonal to each other; a driving coil (13) attached to each- of the stators and, adapted to vibrate the moving member; a position detecting coil (15) attached to each of the stators and adapted to detect the position of the moving-member; moving member control means (63) for driving the driving coils in response to the signal coming from each of the position detecting coils (15) so that the moving member is located in the center of the frame; acceleration computing means (64) for computing an acceleration and an angular acceleration of the moving member based on a driving electric power of each of the driving coils; and mobile data computing means (65) for computing a mobile data accompanying a rotation based on the acceleration and the angular acceleration computed by the acceleration computing means. By virtue of this constitution, various mobile data accompanying rotation can be obtained from an acceleration and an angular acceleration of the moving member and without a need for radio waves coming from an artificial satellite.

In a thirteenth embodiment, a mobile data collecting apparatus comprises a hexahedral frame (62) composed of a non-magnetic material; a rectangular parallelepiped moving member (10) composed of a magnetic material, the moving member (10) being loosely fitted so that the moving member (10) can vibrate in a three-dimensional direction within the frame; two pairs of stators (64, 65) each composed of a magnetic material, the two pairs of stators (64, 65) being arranged opposed to each other on first opposing surfaces (62a, 62b) of all three sets of opposing surfaces (62a, 62b, 62c, 62d, 62e, 62f) of the frame with the moving member sandwiched therebetween; a pair of stators (66) composed of a magnetic body, the paired stators being arranged opposed to each other on second opposing surfaces (62c, 62d) with the moving member sandwiched therebetween; three pairs of stators (68, 69, 70) each composed of a magnetic body, the three pairs of stators being arranged opposed to each other on third opposing surfaces (62e, 62f) in such a manner as to form a triangular shape thereon with the moving member sandwiched therebetween; a driving coil (13) attached to each of the stators and adapted to vibrate the moving member; a position detecting coil (15) attached to each of the stators and adapted to detect the position of the moving member; moving member control means (63) for driving the driving coils in response to the signal coming from each of the position detecting coils (15) so that the moving member is located in the center of the frame; acceleration computing means (64) for computing an acceleration of the moving member based on a driving electric power of each of the driving coils; and mobile data computing means (65) for computing a mobile data based on the acceleration computed by the acceleration computing means. By virtue of this constitution, various mobile data can be obtained from an acceleration of the moving member and without a need for radio waves coming from an artificial satellite. At the same time, a height (a length in a direction where the stators are opposed on a third opposing surface) of the frame can be reduced.

In a fourteenth embodiment of the present invention, a mobile data collecting apparatus comprises a hexahedral frame (62) composed of a non-magnetic material; a rectangular parallelepiped moving member (10) composed of a magnetic material, the moving member (10) being loosely fitted so that the moving member (10) can vibrate in a three-dimensional direction within the frame; two pairs of stators (64, 65) each composed of a magnetic body, the two pairs of stators (64, 65) being arranged opposed to each other on first opposing surfaces (62a, 62b) of all three sets of opposing surfaces (62a, 62b, 62c, 62d, 62e, 62f) of the frame with the moving member sandwiched therebetween- a pair of stators (66) composed of a magnetic body, the paired stators being arranged opposed to each other on second opposing surfaces (62c, 62d) with the moving member sandwiched therebetween; three pairs of stators (68, 69, 70) each composed of a magnetic body, the three pairs of stators being arranged opposed to each other on third opposing surfaces (62e, 62f) in such a manner as to form a triangular shape thereon with the moving member sandwiched therebetween; a driving coil (13) attached to each of the stators and adapted to vibrate the moving member; a position detecting coil (15) attached to each of the stators and adapted to detect the position-of the moving member; moving member control means (63) for driving the driving coils in response to the signal coming from each of the position detecting coils (15) so that the moving member is located in the center of the frame; acceleration computing means (64) for computing an acceleration and an angular-acceleration of the moving member based on a driving electric power of each of the driving coils; and mobile data computing means (65) for computing a mobile data accompanying a rotation based on the acceleration and the angular acceleration computed by the acceleration computing means. By virtue of this constitution, various mobile data accompanying rotation can be obtained from an acceleration and an angular acceleration of the moving member and without a need for radio waves coming from an artificial satellite. At the same time, a height (a length in a direction where the stators are opposed on a third opposing surface) of the frame can be reduced.

It should be noted that the reference numerals in the parentheses represent corresponding elements in the drawings and that they are employed herein only for the sake of convenience. Accordingly, the present invention is by no means limited to or restrained by the description on the drawings.

BRIEF DESCRIPTION OF DRAWINGS

FIG. 2 is an illustration showing a coil receiving structure of a stator, FIG. 2(*a*) is a plan view and FIG. 2(*b*) is a side semi-sectional view;

BEST MODE FOR CARRYING OUT THE INVENTION

Displacement Sensor

First, a displacement sensor of the present invention will be described with reference to the drawing.

Figure 1:
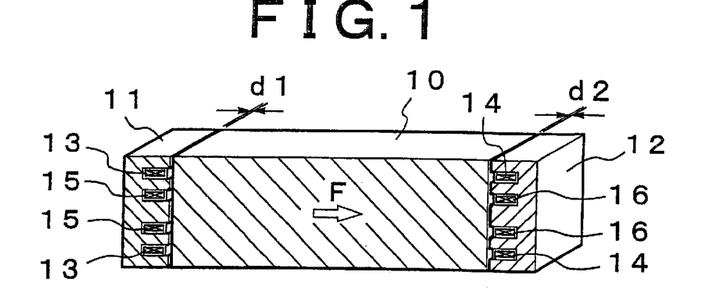
FIG. 1 is a front sectional view showing a basic constitution of a uniaxial force sensor which constitutes a displacement sensor according to the present invention.

FIG. 1 is a front sectional view showing a basic constitution of a uniaxial force sensor according to the present invention. In FIG. 1, one pair of stators 11, 12 are arranged at predetermined intervals d1, d2 on opposite ends (left and right sides in FIG. 1) of a rectangular parallelepiped moving member 10 composed of a magnetic body or material.

The stators 11,12 are each composed of a magnetic body or material similar to the case with the moving member 10. The stators 11, 12 include driving coils 13, 14 and detecting coils 15, 16 as position detectors corresponding to the driving coils 13, 14, respectively. The driving coils 13, 14 and the detecting coils 15,16 are concentrically arranged.

Figures 2A, 2B:
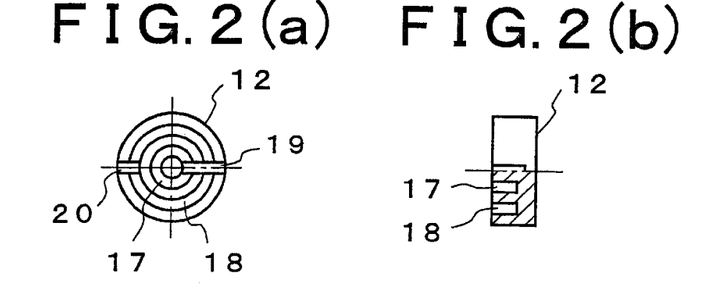

FIGS. 2(a) and 2(b) show a structure of the stators. As shown, the position detecting coils 15,16.and the driving coils 13, 14 may be received directly in receiving grooves 17, 18 which are formed in the stators 11, 12 in a loop-like pattern, respectively and fixedly bonded thereto by means of a resin or mold. Alternatively, the coils are wound around bobbins so that the coil-attached bobbins are received in the receiving grooves 17, 18, respectively and fixedly bonded thereto. The taking-out of the respective coils can be made by pulling out the coils through taking-out grooves or taking-out holes 19, 20 formed in the receiving grooves 17,18.

In the above-mentioned constitution, in order to maintain the intervals d1, d2 between the stators 11, 12 and the central moving member 10 normally equal, the variations in magnetic field closed loop caused by the moving member 10 and the detecting coils 15,16 are detected by the detecting coils 15, 16 and a constant amount of pulse power is supplied to those detecting coils on the side where the interval d1 (or d2) is larger. By performing this sequentially at a high speed, the moving member 10 can be balanced between the stators 11,12. At this time, a difference of power (i.e., electric power supplied to the driving coils 13,14) applied to the moving member 10 from the stators 11, 12 comes to have a value proportional to a force acting on the moving member 10 and it can be taken out in the form of a digital signal of a force F in accordance with a difference in number of the driving pulse supplied to the paired driving coils 13, 14.

Accordingly, in the present invention, it is no longer necessary to perform such an analog processing as pulse-width modulation, amplification or the like which was conventionally required. In the present constitution, owing to the structural features, the positional accuracy of balance of the moving member 10 can be kept to several microns or less. That is, the displacement sensor is designed such that the force applied to the moving member 10 can be detected in an amount of displacement of several microns or less.

Figure 3:
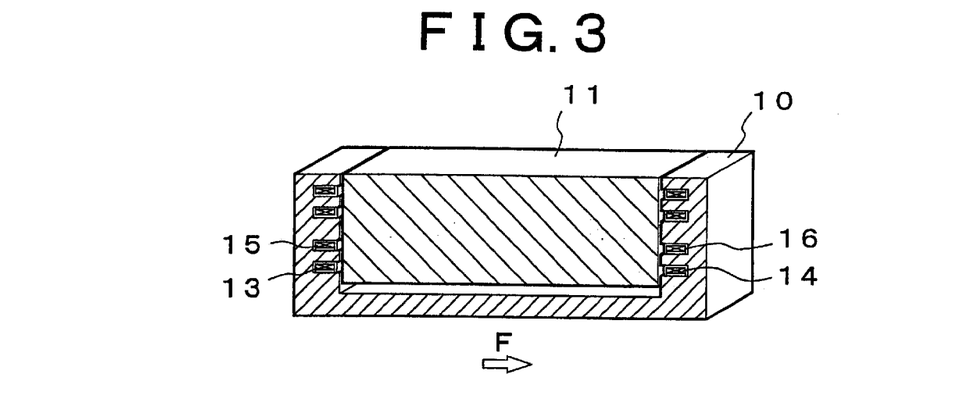
FIG. 3 is a front sectional view showing a basic constitution of a uniaxial sensor which is different from that of FIG. 1.
Figure 4:
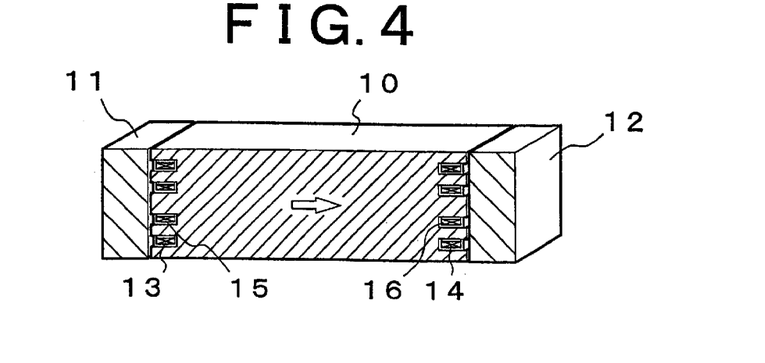
FIG. 4 is a front sectional view showing a basic constitution of a uniaxial force sensor which is different from that of FIG. 3.
Figure 5:
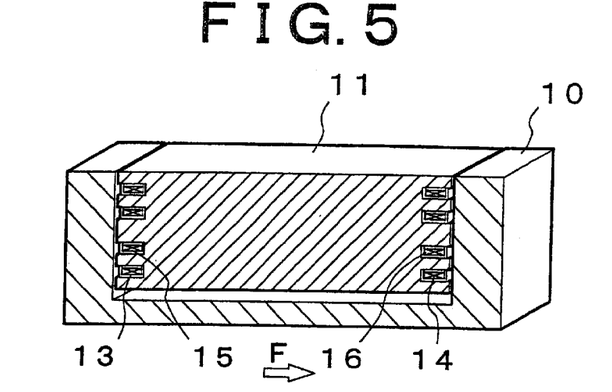
FIG. 5 is a front sectional view showing a basic constitution of a uniaxial force sensor which is different from that of FIG. 4.

FIGS. 3 to 5 are modifications of FIG. 1. Those modifications have a structure similar to that of the uniaxial force sensor shown in FIG. 1 and are different from FIG. 1 only in positional relation among the detecting coils 15, 16, the driving coils 13, 14, the moving member 10 and the stators 11, 12. The present invention can be applied to any of them. The basic operation of them is the same as described above.

In the constitution of FIG. 3, the positional relation between the stator and the moving member is reversed compared to that of FIG. 1. Specifically, the stator is arranged to the center and the moving members are arranged in such a manner as to sandwich the stator. The driving coils 13,14 and the position detecting coils 15, 16 are arranged at the moving members 10 which are arranged on both sides of the stator.

The constitution of FIG. 4 is same as that of FIG. 1 only except that the driving coils 13, 14 and the detecting coils 15, 16 are arranged on opposite ends of the moving member 10 itself The constitution of FIG. 5 is similar to that of FIG. 3 but different than that of FIG. 3 in the respect that the driving coils 13,14 and the detecting coils 15, 16 are arranged on opposite ends of the stator 11 itself One embodiment of a displacement sensor composed of the uniaxial force sensor will now be described.

Figure 6:
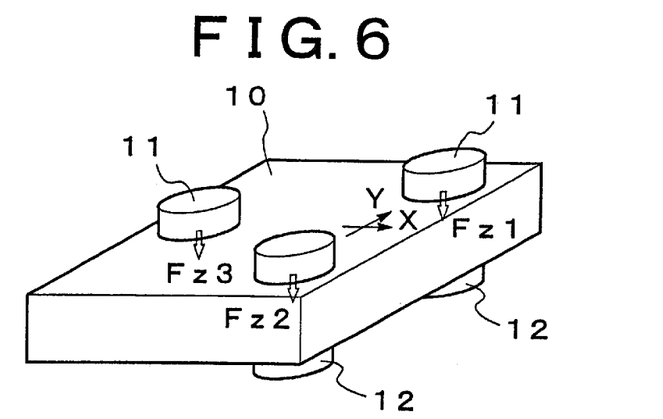
FIG. 6 is a structural diagram showing one embodiment of a displacement sensor of the present invention

FIG. 6 shows a displacement sensor including three Z-axis force sensors composed of the stators 11, 12 arranged in a triangular shape on an X- and Y-axis plane of the plate-like moving member 10. This displacement sensor is designed such that the moving member 10 can freely move on the X- and Y-axis plane by friction 0 and the forces Fz1, Fz2 and Fz3 applied to the respective force sensors can be measured with a super high precision. Moreover, rotating torque of the X- and Y-axis can be computed based on the measured values through a computing method as later described.

Figure 7:
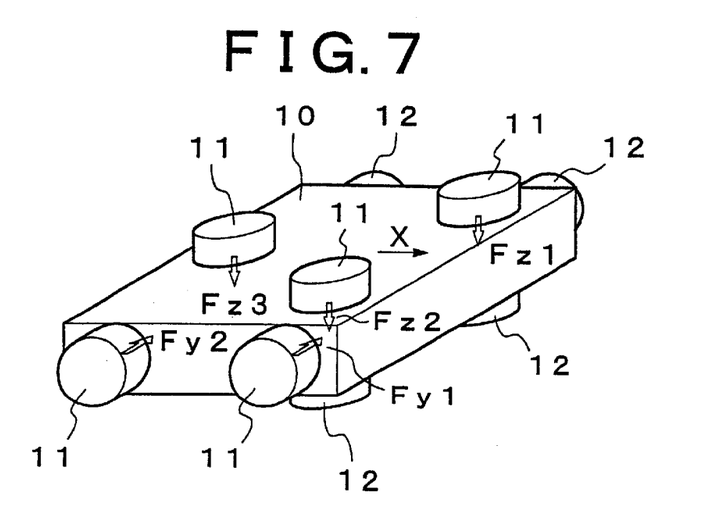
FIG. 7 is a structural diagram showing a different embodiment of a displacement sensor from that of FIG. 6.

FIG. 7 shows a modification, in which two stators 11, 12 are arranged in the Y-axis direction on the displacement sensor of FIG. 6, the moving member 10 can move freely on the X-axis and as illustrated, the forces Fx1, Fz2, Fz3 applied to the force sensors on the Z-axis and the forces Fy1, Fy2 applied to the force sensors on the Y-axis can be-measured with a super high precision. Moreover, the rotating torque of the X-, Y- and Z-axis can be computed based on those measured values, as well.

Figure 8:
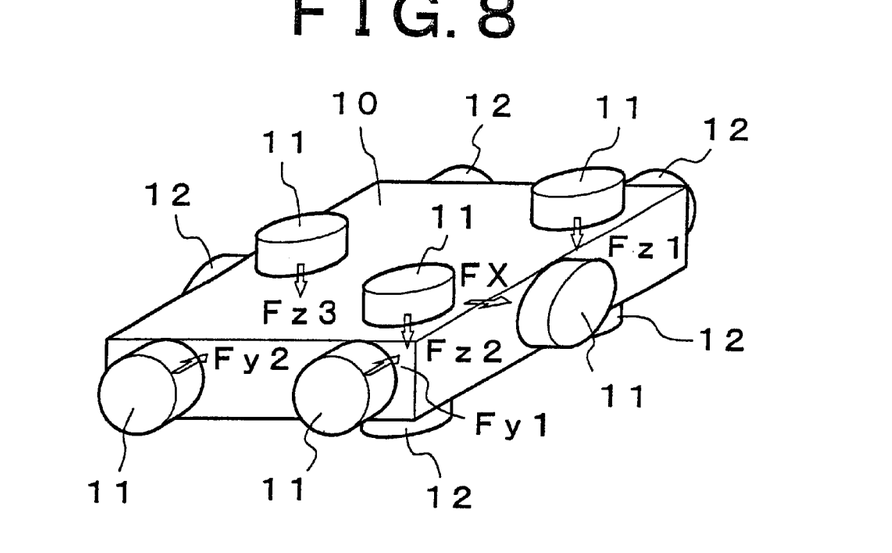
FIG. 8 is a structural.diagram showing a different embodiment of a displacement sensor from that of FIG. 7.

FIG. 8.shows another modification, in which the stators 11, 12 are further arranged in the X-axis direction on the displacement sensor of FIG. 7. This displacement sensor has entirely no degree of freedom on the X-, Y- and Z-axis and in the rotating direction of the X-, Y- and Z-axis. The forces Fz1, Fz2, Fz3 applied to the force sensors on the Z-axis, the forces Fy1, Fy2 applied to the force sensors on the Y-axis and the force Fx1 applied to the force sensor on the X-axis can be measured with a super high precision. Moreover, the rotating torque of the X-, Y- and Z-axis can be computed based on those measured values, as well.

Figure 9:
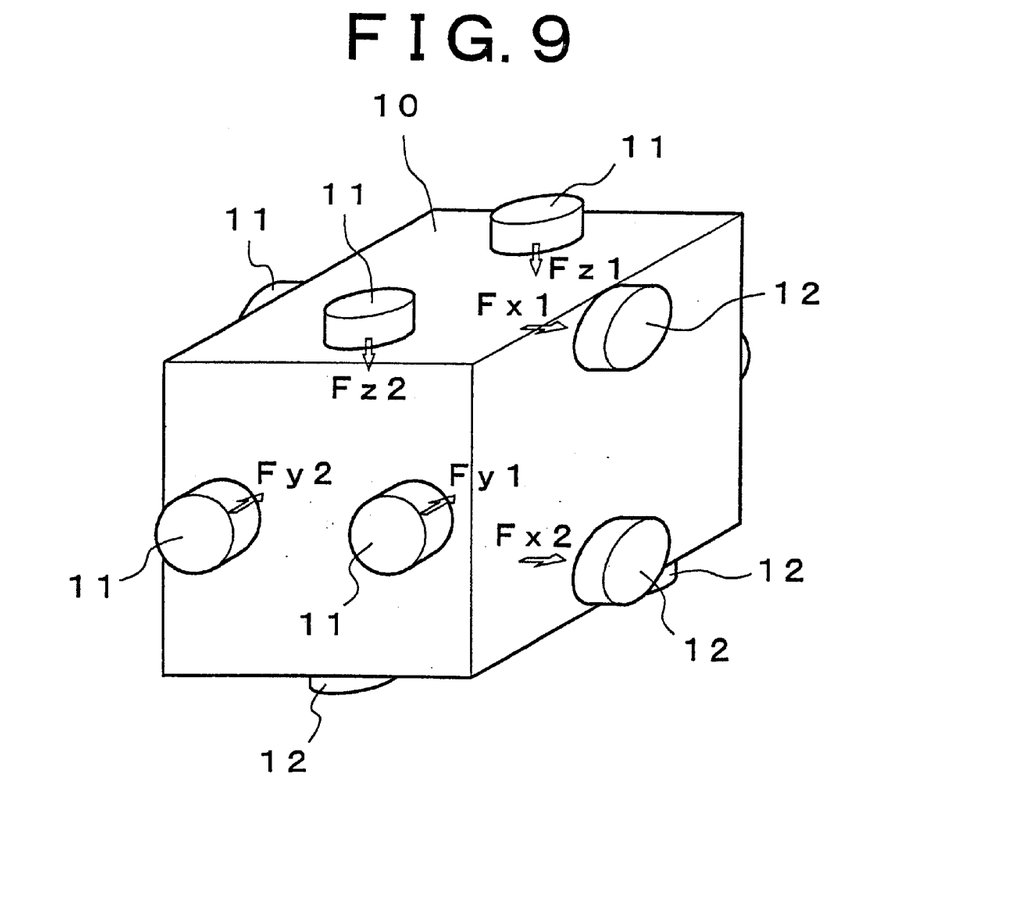
FIG. 9 is a structural diagram showing a different embodiment of a displacement sensor from that of FIG. 8.

FIG. 9 shows still another modification, in which the displacement sensor of FIG. 8 has a cubic moving member 10 and force sensors are all symmetrically arranged on its three X-, Y- and Z-axis planes. In this constitution, the forces Fz1, Fz2 applied to the force sensors of the Z-axis, the forces Fy1, Fy2 applied to the force sensors of the Y-axis and the forces Fx1, Fx2 applied to the force sensors of the X-axis can be measured with a super high precision. This makes it possible to compute the rotating torque of the X-, Y- and Z-axis, as well.

Figure 10:
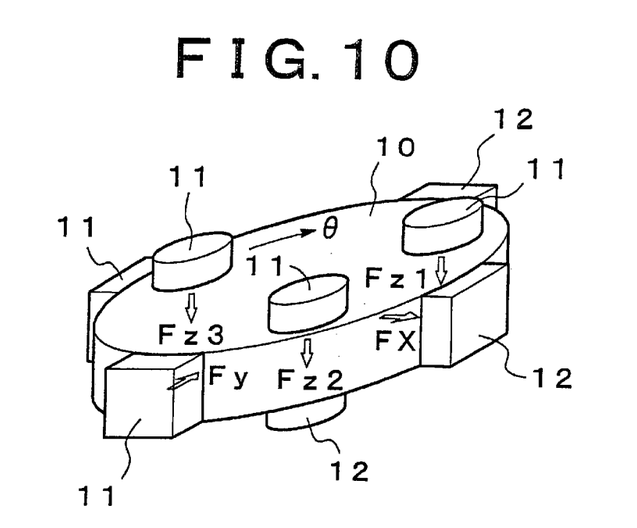
FIG. 10 is a structural diagram showing a different embodiment of a displacement sensor from that of FIG. 9.

FIG. 10 shows another example of a displacement sensor, in which three Z-axis direction force sensors are arranged on a disc-like moving member 10, one each is arranged on the X- and Y-axis plane and one each on the X- and Y-axis of a disc side surface. In this modification, a rotation θ of the moving member 10 in the Z-axis is free, and the forces FZ1, FZ2, FZ3 applied to the force sensors of Z-axis, the force Fy applied to the force sensor of the Y-axis and the force Fx applied to the force sensor of the X-axis can be measured with a super high precision. This makes it possible to compute the rotating torque of the X- and Y-axis, as well.

Figure 11:
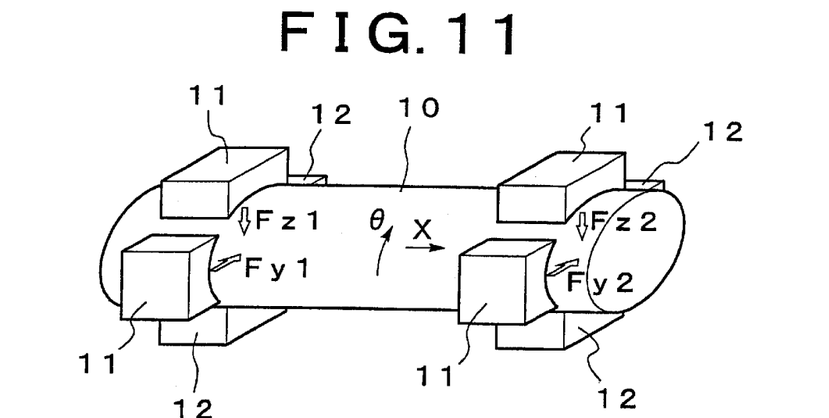
FIG. 11 is a structural diagram showing a different embodiment of a displacement sensor from that of FIG. 10.

FIG. 11 shows still another example of a displacement sensor, in which a circular column-like moving member 10 has two sets of Z- and Y-axis force sensors arranged on the X-axis. In this displacement sensor, the moving member 10 is free in X-axis rotation θ and slide, and the forces Fz1, Fz2 applied to the Z-axis force sensor and the forces Fy1, Fy2 applied to the Y-axis force sensors can be measured with a super high precision. This makes it possible to compute the rotating torque of the Y- and Z-axis.

Figure 12:
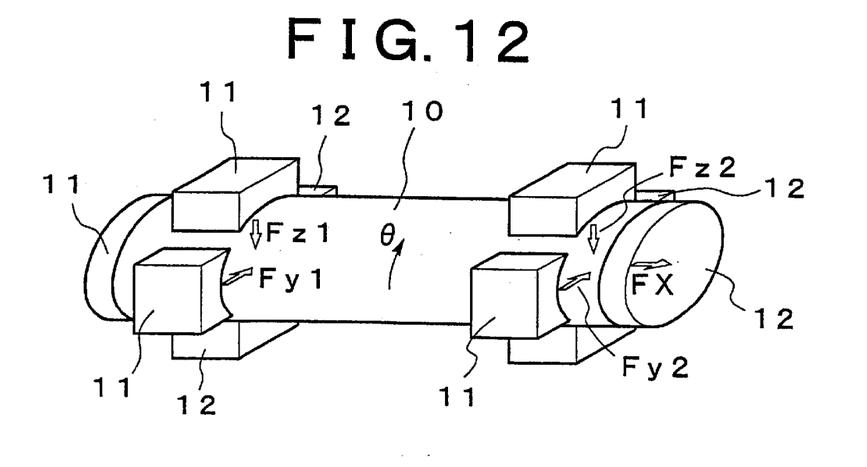
FIG. 12 is a structural diagram showing a different embodiment of a displacement sensor from that of FIG. 11.

FIG. 12 shows a modification, in which the displacement sensor of FIG. 11 further has X-axis force sensors arranged on the moving member 10. In this displacement sensor, rotation of the X-axis is free, and the forces Fz1, Fz2 applied to the Z-axis force sensors, the forces Fy1, Fy2 applied to the Y-axis force sensors and the force Fx applied to the X-axis force sensor can be measured with a super high precision. This makes it possible to compute the rotating torque of the Y- and Z-axis. The above-mentioned various displacement sensors shown in FIGS. 1 to 12 are received in a fixed frame composed of a non-magnetic body.

As a modified example of the above-mentioned displacement sensors, a triaxial displacement sensor will now be described with reference to FIGS. 13, 14.

Figure 13:
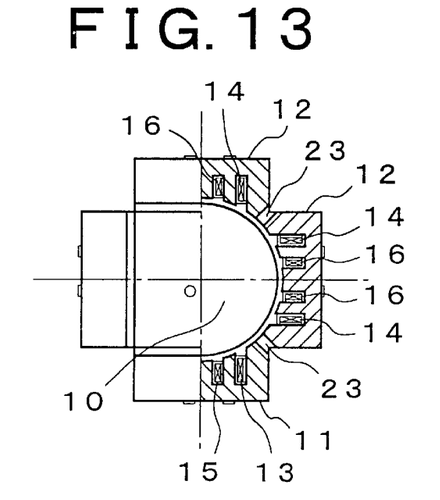
FIG. 13 is a semi-sectional view showing a basic constitution of a triaxial acceleration sensor according to the present invention.
Figure 14:
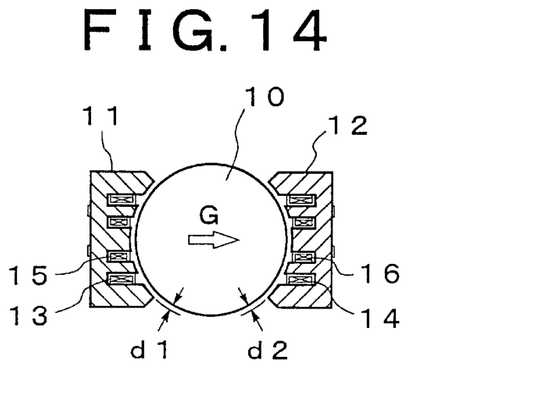
FIG. 14 is a sectional view showing a uniaxial portion of FIG. 13.

FIG. 13 is a semi-sectional view showing a basic constitution of a triaxial acceleration sensor and FIG. 14 is a sectional view showing a uniaxial portion taken out therefrom.

In FIGS. 13 and 14, stators 11, 12 are arranged, in the form of one-pair, about a spherical moving member 10 composed of a magnetic body at predetermined intervals d1, d2 in the triaxial directions X, Y, Z and in such a manner as to sandwich the moving member 10 therebetween. The paired stators 11, 12 are each composed of a magnetic body as in the case with the moving member 10. Each stator 11, 12 has a driving coil 13, 14 and a detecting coil 15, 16 serving as a position detector. Between the adjacent stators 11, 12, there is interposed a shield 23 composed of a non-magnetic body. This shield 23 is adapted to prevent the leakage of magnetic flux of the driving coils 15,16. The triaxial acceleration sensor thus constructed is integrally fixedly received in a fixed frame, not shown, composed of a non-magnetic material.

In FIG. 14, in order to maintain the intervals d1, d2 between the pair of left and right stators 11,12 and the central moving member 10 normally equal, the variations in magnetic field closed loop caused by the moving member 10 and the stators 11, 12 are detected and compared by the detecting coils 15, 16 and a constant amount of electric power is supplied to the driving coil on the side where the interval d1 (or d2) is larger. By sequentially performing this at a high speed, the moving member 10 can be balanced between the stators 11, 12. At that time, a difference in power (i.e., electric power supplied to the driving coils 13, 14) applied to the moving member 10 from the stators 11,12 becomes a value proportional to the force acting on the moving member 10. Since this constitution is a structure in which the moving member 10 is received in the stators and in which it is difficult to apply an energy (force) mechanically thereto from outside unlike the case with the above-mentioned embodiments, the constitution is suited for the detection of an acceleration and the acceleration can be taken out as a digital signal of the acceleration G from a difference in number of the driving pulses applied to the paired driving coils 13, 14. Here, the positional accuracy of balance can be held at several microns or less because of its structural features. In other words, there can be obtained a displacement sensor which is capable of detecting an acceleration applied to the moving member 10 at an amount of displacement of several microns or less.

This uniaxial acceleration sensor is arranged on the X-, Y- and Z-axis to form a triaxial constitution as shown in FIG. 13. By doing so, the moving member 10 can be balanced in the state in which the moving member 10 is perfectly floated in air and hence, a high precision acceleration sensor can be realized.

Figure 15:
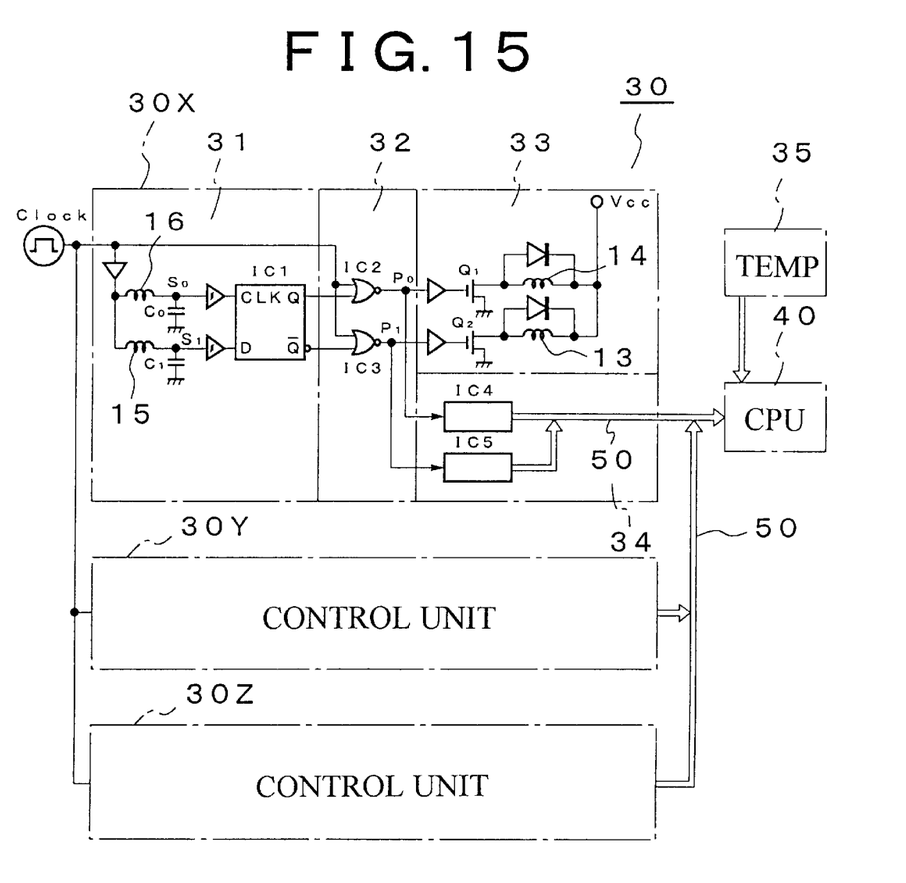
FIG. 15 is a circuit diagram of a control unit of a displacement sensor of the present invention.
Figure 16:
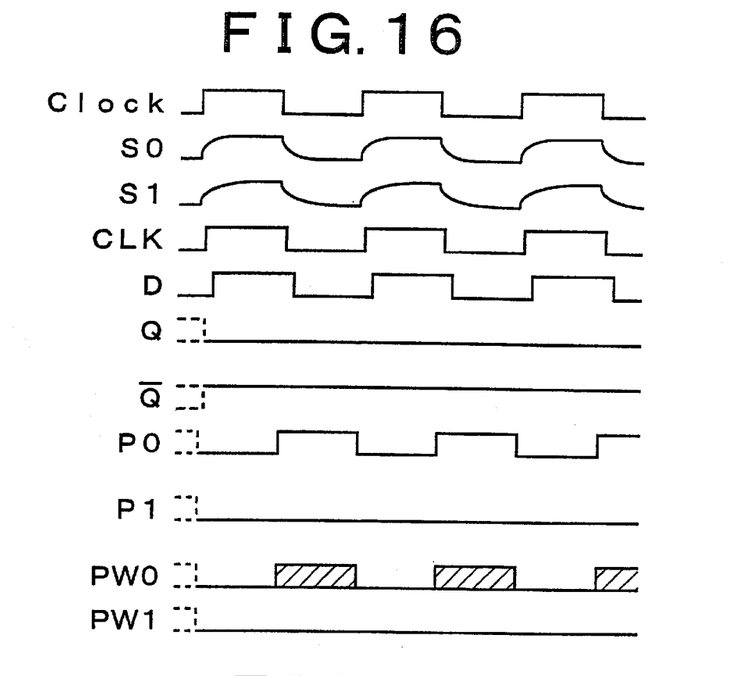
FIG. 16 is an illustration showing waveforms of various parts of the control unit.

Next, operation of a control unit will be described with reference to FIGS. 15 and 16. FIG. 15 is a controller circuit diagram and FIG. 16 is a chart of waveforms of various parts. The control unit 30 is adapted to control the operation of the displacement sensor. The control unit 30 is integrally received in a fixed frame, not shown, together with the stators and the moving member.

The control unit 30 comprises a phase difference comparator circuit 31 for detecting an unbalance of the intervals d1, d2 between the stators 11, 12 and the moving member 10 as a phase difference of a comparing signal through a delay circuit composed of one pair of detecting coils 15, 16 and condensers $C_0$, $C_1$ having a same capacity and connected to one ends of the detecting coils 15, 16 and a flip-flop circuit IC1, a pulse generating circuit 32 for generating driving pulses P0, P1 to either the driving coil 14 or 13 in accordance with the detected phase difference, a driver circuit 33 for driving the driving coils 13,14 through transistors Q1, Q2, a counter circuit 34 including count/latch circuit IC4, IC5 composed of a counter for counting the number of driving pulses and a data latching shift resister, for example, and computing means 40 for computing a force (acceleration) applied to the moving member 10 based on the counted value.

This control unit 30 is designed for a triaxial acceleration sensor and includes specific control units 30X, 30Y, 30Z corresponding- to the X-, Y- and Z-axis. It should be noted, however, that the circuit constitutions and operation thereof are all the same.

Operation of the control circuit 30X corresponding to one axis (X-axis) thereof will now be described. It should be noted that this operation is performed in such an unbalanced state in which the moving member 10 is offset to the stator 11 side (i.e., detecting coil 15 side) (d2>d1).

A rectangular wave signal Clock of 1 MHz to 10 KHz is supplied as the aforementioned comparing signal to the detecting coils 15, 16 through a buffer. When the moving member 10 is in the above-mentioned positional relation (displacement), an inductance L16 of the detecting coil 16 is in a relation of L16>L15 with an inductance L15 of the detecting coil 15. In the delay circuit connected with the detecting coils 15, 16, delay output signals SO, S1 each having a different amount of delay corresponding to the values of the inductance L16, L15 are obtained. The delay output signals SO, S1 are waveform-shaped through the buffer and input to a CLK terminal and a D terminal of the flip-flop IC1, respectively. By doing so, a phase difference between the two signals SO, S1 can be detected. In the case of this embodiment, an output Q of the flip-flop IC1 is set to "L" and the other output is set to "H".

In the pulse generating circuit 32, both outputs of the flip-flop ICI are input into NOR circuits IC2, IC3 and a driving pulse PO of a constant pulse width, which is synchronous with the pulse signal Clock, is output to the NOR circuit IC2 whose phase is earlier (i.e., the amount of delay is smaller) through the logical sum with the pulse signal Clock.

In the driver circuit 33, the transistor Q1 is turned on/off based on the driving pulse P0, a constant amount of electric power PW0 is supplied to the driving coil 14 and the moving member 10 is controlled to be displaced to the stator 12 side.

At the same time, the number of driving pulses P0 is counted by the count/latch circuit IC4 and the latched count data are transmitted to computing means 40 (for example, CPU, that is, Central Processing Unit) through a data bus 50.

The counter data are transmitted at a cycle of integral multiple (for example, at a cycle of 10 to 100 ms) of the pulse signal Clock.

There has been described an unbalanced state in which the moving member 10 is offset to the stator 11 side (i.e., the detector coil 15 side) (d2>d1). In another unbalanced state in which the moving member 10 is offset to the stator 12 side (d2<d1), it is a matter of course that the driving coil 13 is pulse driven, the number of the driving pulse P1 at that time is counted by the counter/latch circuit IC5 and the count data are transmitted to the computing means 40 at the above-mentioned constant cycle.

Then, the computing means 40 executes a computing operation of the force (acceleration) based on the transferred data input therein.

Presuming, for example, that the numbers of the driving pulses transmitted at one cycle (i.e., the numbers of rotation of the constant electric powers PW0, PW1 supplied to the driving coils 13, 14, respectively) per axis are N1, N2, the force F applied to this axis can be expressed by F=K1×N1−K2×N2 (where K1, K2 represent force coefficients of both of them). In the case where two pairs of force sensors are arranged on an orthogonal plane of one axis, a rotating torque of that axis can be computed based on a difference between the forces F1 and F2 obtained through the above computing method. Moreover, if the forces F1, F2, F3 are computed by arranging three pairs of force sensors in a triangular shape on an orthogonal plane of one axis, a biaxial rotating torque can be computed based on the differences of the respective forces.

Although the coefficient is different, the acceleration G can be computed through the similar computing procedure as above. If the acceleration coefficients are K10, K20, the acceleration G can be represented by G=K10·N1−K20·N2 per axis. Therefore, the above purpose can be achieved by computing the accelerations Gx, Gy, Gz in three directions of the X-, Y-and Z-axis.

Since it can be contemplated that the above coefficients vary depending on temperature, it is preferred that a temperature sensor 35 is attached to the inside of each sensor and the coefficients are corrected based on the detected temperatures. By virtue of this arrangement, more correct results of computation can be obtained.

Although the detecting coil for detecting the displacement of the moving member 10 as a variation in inductance is used as a position detector in the above embodiments, the present invention is not limited to this. The displacement of the moving member 10 may be detected as a variation in electrostatic capacity. In that case, each delay circuit is, of course, composed of a CR circuit.

As described above, since a displacement sensor of the present invention can realize an extremely high precision, its application field can be enlarged. For example, it can be applied not only to measuring devices such as a force-meter, an accelerometer and a seismograph, but also to various other devices and instruments including machine-tools and mechanism devices such as an X, Y table and a turn table, devices and instruments relating to automotive vehicles, airplanes or the like, such as a navigation system, a speed meter and a distance meter.

As explained above, according to the present invention described in the first to third embodiments, stators are arranged opposed to each other with respect to a moving member, driving coils are driven with an electric power corresponding to intervals between the moving member and the stators so that the moving member is balanced at an intermediate position between the paired stators, and a force or acceleration applied to the moving member is computed with a driving electric power of the driving coils. Accordingly, by arranging such sensors on the X-, Y- and Z-axis, the moving member can be balanced in a state in which the moving member is perfectly floated in air and an ideal displacement sensor having no mechanical friction can be realized. Moreover, the positional accuracy of balance of the moving member can be kept to several microns or less. In other words, a high precision displacement sensor can be obtained in which the force (acceleration) applied to the moving member can be detected in an amount of displacement of several microns or less.

According to the present invention described in the fourth embodiment, a non-magnetic material is interposed between the adjacent stators on the X-, Y- and Z- axis. Accordingly, the leakage of magnetic flux from the stators can be prevented. Operation failure due to the leakage of magnetic flux can be eliminated and hence, reliability is enhanced.

According to the present invention described in the fifth embodiment, the driving of the driving coils is a pulse driving having a constant pulse-width and a driving electric power is computed based on the number of the driving pulses. Accordingly, the driving electric power can be computed in a very simple and easy manner and without a need of such a complicated analog processing as pulse-width modulation, which was conventionally required. Since calculation errors hardly occur, a high precision detection can be obtained. Moreover, since the driving pulse is a common signal to the driving coils, no unbalance occurs to the electric power supplied to the driving coils.

According to the present invention described in the sixth to eighth embodiments, the control unit includes a phase comparator circuit for detecting an unbalance of the intervals between the paired stators and the moving member as a difference in phase of the comparing signal, a pulse generating circuit for supplying a driving pulse of a constant pulse-width to one of the driving coils in accordance with the detected phase difference, a driver circuit for driving the driving coils, a counter circuit for counting the number of the driving pulses, and computing means for computing a force or acceleration applied to the moving member based on a counted value of the counter circuit. Accordingly, since all can be processed by digital means without a need of analog means as conventionally required, a high precision displacement sensor can be realized, in which the circuit constitution can be simplified, which is inexpensive and which is stable and hardly susceptible to the fluctuations in temperature and power supply.

According to the present invention described in the ninth embodiment, the computation or processing of the computing means (processor) is corrected based on a detection output of the temperature sensor. Accordingly, a more correct force (acceleration) can be computed which is hardly susceptible to the variations in temperature, etc.

Moreover, the driving of the driving coils is a pulse driving having a constant pulse-width and a driving electric power is computed based on the number of the driving pulses. Accordingly, the driving electric power can be computed in a very simple and easy manner and without a need of such a complicated analog processing as pulse-width modulation, which was conventionally required. Since calculation errors hardly occur, a high precision detection can be obtained. Moreover, since the driving pulse is a common signal to all of the driving coils, there will be no unbalance occurring to the electric power supplied to the driving coils.

Mobile Data Collecting Apparatus

Embodiments of a mobile data collecting apparatus of the present invention will now be described with reference to the drawings.

<First Embodiment>

Figure 17:
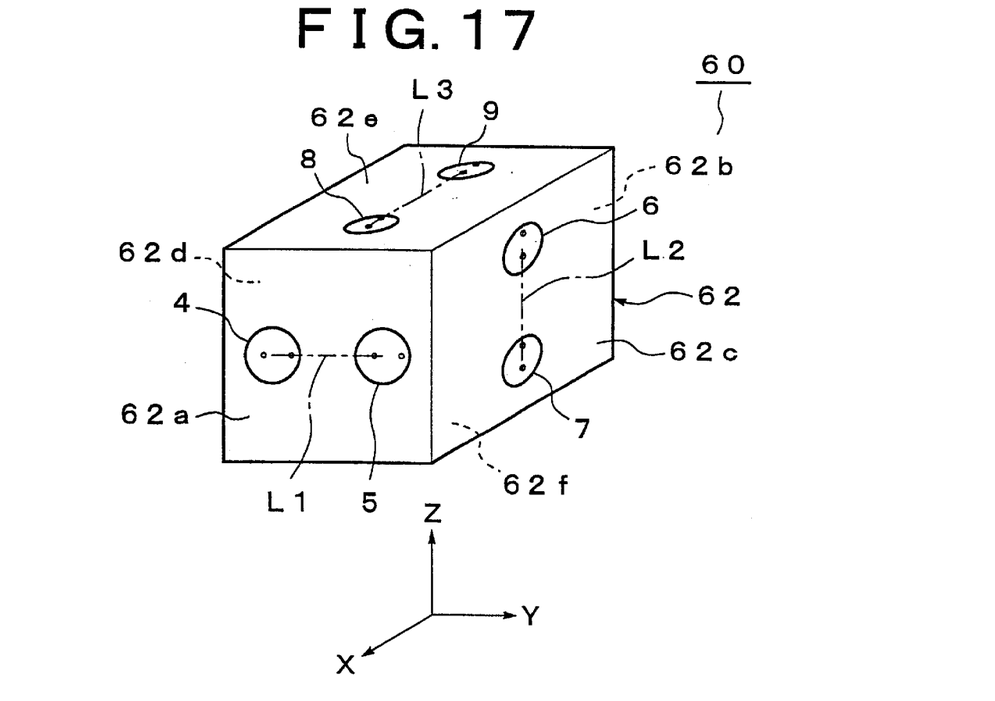
FIG. 17 is a perspective view showing a first embodiment of a mobile data collecting apparatus according to the present invention.
Figure 18:
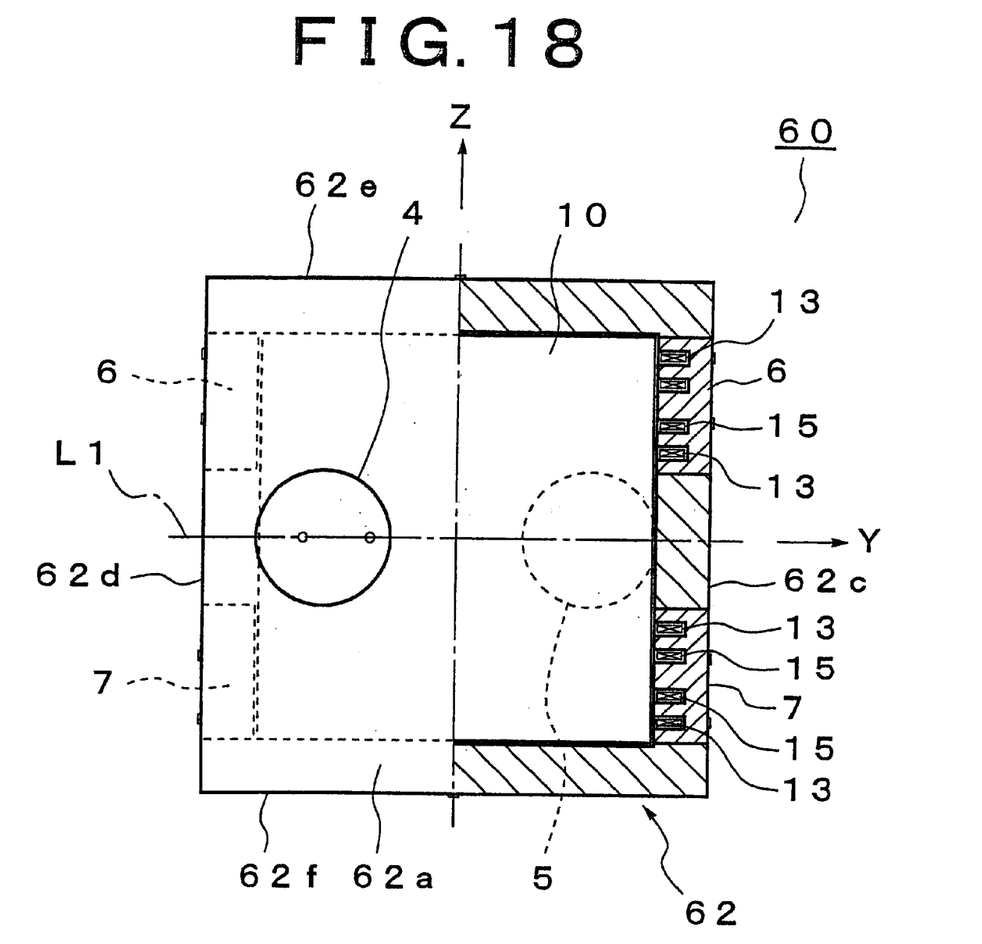
FIG. 18 is a front sectional view of the mobile data collecting apparatus shown in FIG. 17.

This mobile data collecting apparatus 60 includes, as shown in FIGS. 17 and 18, a hexahedral frame 62 composed of a non-magnetic material. A rectangular parallelepiped moving member 10 composed of a magnetic body such as ferrite is loosely fitted so that the moving member 10 can vibrate in a three-dimensional direction (X-axis, Y-axis, Z-axis direction) within the frame.

On the other hand, two pairs of stators 4, 5 each composed of a magnetic body are arranged opposed to each other in the X-axis direction on one set of opposing surfaces 62a, 62b orthogonal to the X-axis with the moving member 10 sandwiched therebetween. Two connecting lines L1 each connecting the stators 4, 5 are all in alignment with the Y-axis direction. Two pairs of stators 6, 7 each composed of a magnetic material are arranged opposed to each other in the Y-axis direction on one set of opposed surfaces 62c, 62d orthogonal to the Y-axis with the moving member 10 sandwiched therebetween. Two connecting lines L2 each connecting the stators 6, 7 are all in alignment with the Z-axis direction. Moreover, two pairs of stators 8, 9 each composed of a magnetic body are arranged opposed to each other in the Z-axis direction on one set of opposed surfaces 62e, 62f orthogonal to the Z-axis with the moving member 10 sandwiched therebetween. Two connecting lines L3 each connecting the stators 8, 9 are all in alignment with the X-axis direction.

A large annular driving coil 13 and a small annular position detecting coil 15, as shown in FIG. 18, are concentrically embedded in an inner surface of each of the stators 4, 5, 6, 7, 8, 9.

Figure 19:
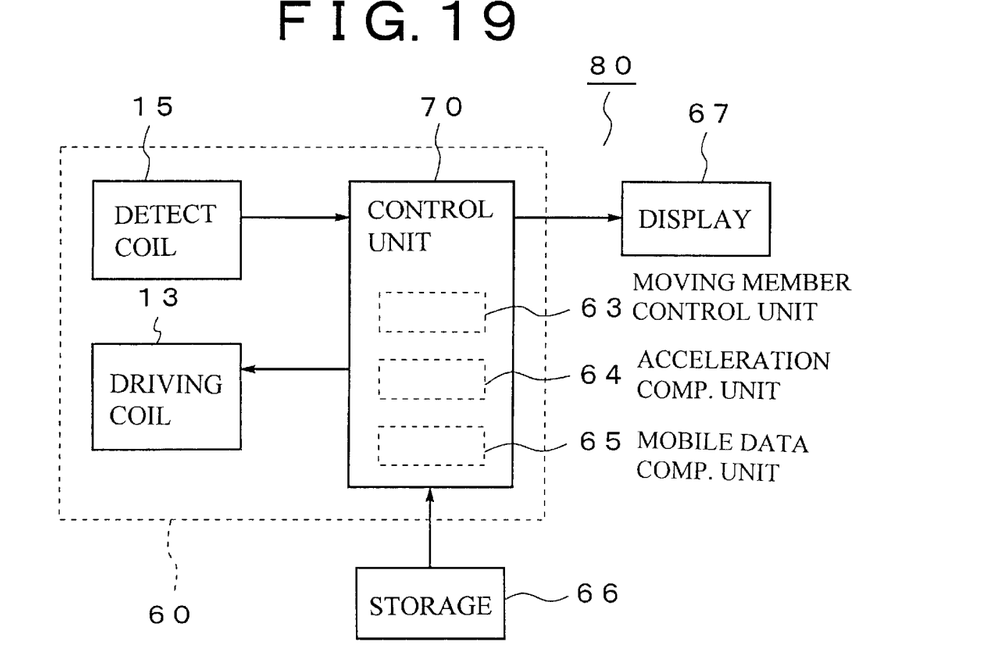
FIG. 19 is a control block diagram of a navigation system equipped with the mobile data collecting apparatus shown in FIG. 17.

As shown in FIG. 19, the mobile data collecting apparatus 60 includes a main control unit 70 such as a CPU. The main control unit 70 has a moving member control unit 63, an acceleration computing unit 64 and a mobile data computing unit 65 incorporated therein. Moreover, the main control unit 70 is connected with the driving coil 13 and the position detecting coil 15. By connecting a map data storage unit 66 and a mobile data display unit 67 to the main control unit 70 of the mobile data collecting apparatus 60, a navigation system 80 is constituted.

Since the mobile data collecting apparatus 60 has the abovementioned constitution, it is possible for this apparatus to compute an acceleration in a three-dimensional direction and to obtain various mobile data based on the acceleration thus computed, in the manner as described hereinafter.

In order to maintain the intervals d1, d2 between one pair of stators 6, 6 and the moving member 10 normally equal, the moving member control unit 63 of the main control unit 70 detects, through the position detecting coils 15, the variations in magnetic field closed loop caused by the moving member 10 and the stators 6, then compares the two and supplies a constant amount of pulse power to those driving coils on the side where the interval d1 (or d2) is larger. By performing this sequentially at a high speed, the moving member 10 is balanced between the stators 6, 6. At this time, a difference of power (i.e., electric power supplied to the driving coil 10 of each stator 6) applied to the moving member 10 from each stator 6 has a value proportional to a force acting on the moving member 10 in the Y-axis direction and hence, proportional to the acceleration, the acceleration computing unit 64 of the main control unit 70 computes a Y-axis component of the acceleration of the moving member 10 based on the driving electric power of the driving coil 13 of each stator 6. Here, one pair of stators 7, 7 may be used instead of one pair of stators 6, 6.

Likewise, an X-axis component of the acceleration of the moving member 10 can be computed based on the driving electric power of the driving coils 13 of one pair of stators 4, 4 (or 5, 5), and a Z-axis component of the acceleration of the moving member 10 can be computed based on the driving electric power of the driving coils 13 of one pair of stators 8, 8 (or 9, 9).

After the three components (the X-axis component, the Y-axis component and the Z-axis component) of the acceleration of the moving member 10 are obtained in the manner as just mentioned, the acceleration computing unit 64 of the main control unit 70 computes an acceleration of the moving member 10 by vector combining those three-components.

Then, the mobile data computing unit 65 of the main control unit 70 computes a desired mobile data item based on the acceleration thus obtained. For example, if this acceleration is integrated, a speed can be obtained and if integrated once again, a position can be obtained.

It is also possible for the mobile data collecting apparatus 60 to compute not only an acceleration in the three-dimensional direction but also an angular acceleration and to obtain various mobile data accompanying a rotation based on the acceleration and angular acceleration thus obtained.

Since the stators 4, 5 arranged opposed to each other in the X-axis direction are aligned along the Y-axis direction as shown in FIG. 17, first, the acceleration computing unit 64 of the main control unit 70 computes a Z-axis component of the angular acceleration of the moving member 10 by comparing the driving electric powers of the driving coils 13 embedded in the stators. 4, 5. Since the stators 6, 7 arranged opposed to each other in the Y-axis direction are aligned along the Z-axis direction, the acceleration computing unit 64 of the main control unit 70 then computes an X-axis component of the angular acceleration of the moving member 10 by comparing the driving electric powers of the driving coils 13 embedded in the stators 6, 7. Since the stators 8, 9 arranged opposed to each other in the Z-axis direction are aligned along the X-axis direction, the acceleration computing unit 64 of the main control unit 70 finally computes a Y-axis component of the angular acceleration of the moving member 10 by comparing the driving electric powers of the driving coils 13 embedded in the stators 8, 9. Then, the three components (the X-axis component, the Y-axis component and the Z-axis component) of the angular acceleration of the moving member 3 are vector combined to compute an angular acceleration of the moving member 3.

Subsequently, the mobile data computing unit 65 of the main control unit 70 computes a desired data item involving a rotation based on the angular acceleration and the acceleration thus obtained. For example, if this angular acceleration is integrated, an angular velocity can be obtained and if integrated once again, an angle can be obtained.

After the mobile data thus obtained are compared with the map data stored in the map data storage unit 66 and properly corrected, the corrected data are displayed on the mobile data display unit 67, thus exhibiting the function of navigation system.

Figure 20:
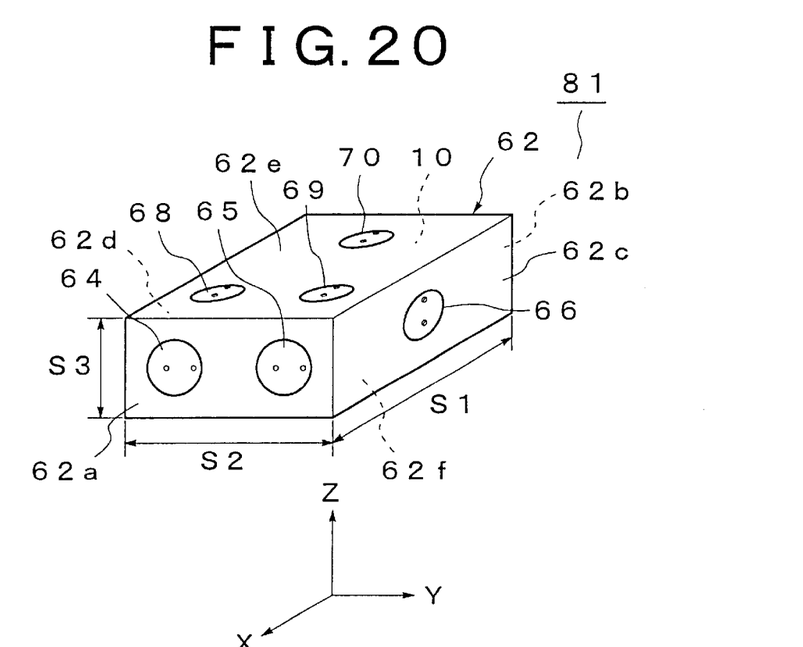
FIG. 20 is a perspective view showing a second embodiment of a mobile data collecting apparatus according to the present invention.

Although, two pairs of stators 4, 5, 6, 7, 8, 9 are arranged on each of the three sets of opposing surfaces 2a, 2b, 2c, 2d, 2e, 2f of the regular hexahedral frame in the first embodiment, it is also possible to obtain a low-height type mobile data collecting apparatus 81 by giving a thought to the arrangement of the stators 4, 5, 6, 7, 8, 9, in which the height (length in the uniaxial direction) of the frame 62 is reduced to about a half Such a low-height type data collecting apparatus 81 will now be described hereinafter.

<Second Embodiment>

FIG. 20 shows a perspective view of a second embodiment of a mobile data collecting apparatus according to the present invention.

This low-height type mobile data collecting apparatus 81, as shown in FIG. 20, includes a hexahedral frame 62 composed of a non-magnetic material. An outside dimension of the frame 62 is such that a length S1 in the X-axis direction is equal to a length S2 in the Y-axis direction and a length S3 in the Z-axis direction is about half the length S1 in the X-axis direction and the length S2 in the Y-axis direction. A rectangular parallelepiped moving member 10 composed of a magnetic body is loosely fitted so that the moving member can vibrate in a three-dimensional direction (the X-axis direction, the Y-axis direction and the Z-axis direction) within the frame 62. A dimension of this moving member 10 corresponds to an outside dimension of the frame 62.

On the other hand, two pairs of stators 64, 65 each composed of a magnetic body are arranged opposed to each other in the X-axis direction on one set of opposed surfaces 62a, 62b orthogonal to the X-axis with the moving member 10 sandwiched therebetween. Two connecting lines each connecting the stators 64, 65 are all in alignment with the Y-axis direction. One pair of stators 66 composed of a magnetic material are arranged opposed to each other in the Y-axis direction on one set of opposed surfaces 62c, 62d orthogonal to the Y-axis with the moving member 10 sandwiched therebetween. Here, the three pairs of stators 64, 65, 66 are all arranged on a same X-Y plane. Moreover, three pairs of stators 68, 69, 70 each composed of a magnetic material are arranged opposed to each other in the Z-axis direction on one set of opposed surfaces 62e, 62f orthogonal to the Z-axis with the moving member 10 sandwiched therebetween. If those stators 68, 69, 70 are connected, a triangular shape orthogonal to the Z-axis is formed.

All the remaining constitution is the same as the above-mentioned first embodiment.

Accordingly, it is also possible for this mobile data collecting apparatus to compute an acceleration and an angular acceleration in a three-dimensional direction and to obtain various mobile data accompanying a rotation based on the acceleration and the angular acceleration thus computed.

Although only one pair of stators 66 are attached to the one set of opposing surfaces 62c, 62d of the frame 62, three pairs of stators 68, 69, 70 are attached to another one set of opposing surfaces 62e, 62f Accordingly, no inconveniences are encountered in obtaining various mobile data as in the case with the mobile data collecting apparatus 60 described in the first embodiment.

That is, since the stators 64, 65 arranged opposed to each other in the X-axis direction are aligned along the Y-axis direction, the Z-axis component of the angular acceleration of the moving member 10 can be computed by comparing the driving electric power of the driving coils (not shown) embedded in the stators 64, 65. Since the stators 68, 69, 70 arranged opposed to each other in the Z-axis direction form a triangular shape on the X-Y plane, the X-axis component and the Y-axis component of the angular acceleration of the moving member 10 can be computed by comparing the driving electric power of the driving coils (not shown) embedded in the stators 68, 69, 70.

As described hereinbefore, according to the present invention, a mobile data collecting apparatus comprises a hexahedral frame 62 composed of a non-magnetic material; a rectangular parallelepiped moving member 10 composed of a magnetic material, the moving member (10) being loosely fitted so that the moving member 10 can vibrate in a three-dimensional direction within the frame; two pairs of stators 4, 5, 6, 7, 8, 9 each composed of a magnetic material, the two pairs of stators 4, 5, 6, 7, 8, 9 being arranged opposed to each other on three sets of opposed surfaces 62a, 62b, 62c, 62d, 62e, 62f of the frame with the moving member sandwiched therebetween so that three kinds of connecting lines L1, L2, L3 thereof are orthogonal to each other; a driving coil 13 attached to each of the stators and adapted to vibrate the moving member; a position detecting coil 15 attached to each of the stators and adapted to detect the position of the moving member; moving member control means such as a moving member control unit 63 for driving the driving coils 13 in response to the signal from each of the position detecting coils 15 so that the moving member 10 is located in the center of the frame 62; acceleration computing means such as an acceleration computing unit 64 for computing an acceleration of the moving member 10 based on a driving electric power of each of the driving coils 13; and mobile data computing means such as a mobile data computing unit 65 for computing a mobile data based on the acceleration computed by the acceleration computing means. Accordingly, since various mobile data can be obtained from the acceleration of the moving member 10 without a need for radio waves coming from an artificial satellite, there can be provided a mobile data collecting apparatus 60 which can be used even in a place where radio waves coming from an artificial satellite do not reach, in which errors are lessened and which is inexpensive.

Moreover, according to the present invention, a mobile data collecting apparatus comprises a hexahedral frame 62 composed of a non-magnetic material; a rectangular parallelepiped moving member 10 composed of a magnetic material, the moving member 10 being loosely fitted so that the moving member 10 can vibrate in a three-dimensional direction within the frame 62; two pairs of stators 4, 5, 6, 7, 8, 9 each composed of a magnetic material, the two pairs of stators 4, 5, 6, 7, 8, 9 being arranged opposed to each other on three sets of opposed surfaces 62a, 62b, 62c, 62d, 62e, 62f of the frame 62 with the moving member 10 sandwiched therebetween so that three kinds of connecting lines L1, L2, L3 thereof are orthogonal to each other; a driving coil 13 attached to each of the stators and adapted to vibrate the moving member 10; a position detecting coil 15 attached to each of the stators and adapted to detect the position of the moving member 10; moving member control means such as a moving member control unit 63 for driving the driving coils 13 in response to the signal coming from each of the position detecting coils 15 so that the moving member 10 is located in the center of the-frame 62; acceleration computing means such as an acceleration computing unit 64 for computing an acceleration and an angular acceleration of the moving member 10 based on a driving electric power of each of the driving coils 13; and mobile data computing means such as a mobile data computing unit 65 for computing a mobile data accompanying a rotation based on the acceleration and the angular acceleration computed by the acceleration computing means. Accordingly, since various mobile data accompanying a rotation can be obtained from the acceleration and the angular acceleration of the moving member 10 without a need for radio waves coming from an artificial satellite, there can be provided a mobile data collecting apparatus 81 which can be used even in a place where radio waves coming from an artificial satellite do not reach, in which errors are lessened and which is inexpensive.

Moreover, according to the present invention, a mobile data collecting apparatus comprises a hexahedral frame 62 composed of a non-magnetic material; a rectangular parallelepiped moving member 10 composed of a magnetic material, the moving member 10 being loosely fitted so that the moving member 10 can vibrate in a-three-dimensional direction within the frame 62; two pairs of stators 64, 65 each composed of a magnetic material, the two pairs of stators 64, 65 being arranged opposed to each other on first opposing surfaces 62a, 62b of all three sets of opposing surfaces 62a, 62b, 62c, 62d, 62e, 62f of the frame 62 with the moving member 10 sandwiched therebetween; a pair of stators 66 composed of a magnetic material, the paired stators 66 being arranged opposed to each other on second opposing surfaces 62c, 62d with the moving member 10 sandwiched therebetween; three pairs of stators 68, 69, 70 each composed of a magnetic material, the three pairs of stators 68, 69, 70 being arranged opposed to each other on third opposing surfaces 62e, 62f in such a manner as to form a triangular shape thereon with the moving member 10 sandwiched therebetween; a driving coil 13 attached to each of the stators and adapted to vibrate the moving member 10; a position detecting coil 15 attached to each of the stators and adapted to detect the position of the moving member 10; moving member control means such as a moving member control unit 63 for driving the driving coils 13 in response to the signal coming from each of the position detecting coils 15 so that the moving member 10 is located in the center of the frame 62; acceleration computing means such as an acceleration computing unit 64 for computing an acceleration of the moving member 10 based on a driving electric power of each of the driving coils 13; and mobile data computing means such as a mobile data computing unit 65 for computing a mobile data based on the acceleration computed by the acceleration computing means. Accordingly, since various mobile data can be obtained from the acceleration of the moving member 10 and the height (length in the opposing direction of the stators 68, 69, 70 on the third opposing surfaces 62e, 62f) of the frame 62 can be reduced without a need for radio waves coming from an artificial satellite, there can be provided a mobile data collecting apparatus 81 which can be used even in a place where radio waves coming from an artificial satellite do not reach, in which errors are lessened and which is inexpensive.

Moreover, according to the present invention, a mobile data collecting apparatus comprises a hexahedral frame 62 composed of a non-magnetic material; a rectangular parallelepiped moving member 10 composed of a magnetic material, the moving member 10 being loosely fitted so that the moving member 10 can vibrate in a three-dimensional direction within the frame 62; two pairs of stators 64, 65 each composed of a magnetic material, the two pairs of stators 64, 65 being arranged opposed to each other on first opposing surfaces 62a, 62b of all three sets of opposing surfaces-62a, 62b, 62c, 62d, 62e, 62f of the frame 62 with the moving member 10 sandwiched therebetween; a pair of stators 66 composed of a magnetic material, the paired stators 66 being arranged opposed to each other on second opposing surfaces 62c, 62d with the moving member 10 sandwiched therebetween; three pairs of stators 68, 69, 70 each composed of a magnetic material, the three pairs of stators 68, 69, 70 being arranged opposed to each other on third opposing surfaces 62e, 62f in such a manner as to form a triangular shape thereon with the moving member 10 sandwiched therebetween; a driving coil 13 attached to each of the stators and adapted to vibrate the moving member 10; a position detecting coil 15 attached to each of the stators and adapted to detect the position of the moving member 10; moving member control means such as a moving member control unit 63 for driving the driving coils 13 in response to the signal coming from each of the position detecting coils 15 so that the moving member 10 is located in the center of the frame 62; acceleration computing means such as an acceleration computing unit 64 for computing an acceleration and an angular acceleration of the moving member 10 based on a driving electric power of each of the driving coils 15; and mobile data computing means such as a mobile data computing unit 65 for computing a mobile data accompanying a rotation based on the acceleration and the angular acceleration computed by the acceleration computing means.

Accordingly, since various mobile data accompanying a rotation can be obtained from the acceleration and the angular acceleration of the moving member 10 and the height (length in the opposing direction of the stators 68, 69, 70 on the third opposing surfaces 62e, 62f) of the frame 62 can be reduced without a need for radio waves coming from an artificial satellite, there can be provided a mobile data collecting apparatus 81 which can be used even in a place where radio waves coming from an artificial satellite do not reach, in which errors are lessened and which is inexpensive.

What is claimed is:

1. A displacement sensor comprising:
    a moving member composed of a magnetic material;
    a first stator and a second stator each composed of a magnetic material and arranged opposed to each other with respect to said moving member, said first stator comprising a first driving coil and a first position detector corresponding to said first driving coil, and said second stator comprising a second driving coil and a second position detector corresponding to said second driving coil; and
    a control unit operable to: drive at least one of said first and second driving coils, based on a detection output coming from at least one of said first and second position detectors, with an electric power corresponding to a first interval between said first stator and said moving member and a second interval between said second stator and said moving member so as to balance said moving member at an intermediate position between said first and second stators; and compute a force or acceleration applied to said moving member with a driving electric power of said first and second driving coils, said control unit comprising:
        a phase comparator circuit operable to supply a comparing signal to said first and second position detectors and to detect an unbalance between the first and second intervals as a difference in phase of the comparing signal;
        a pulse generating circuit operable to supply a driving pulse of a constant pulse-width to one of said first and second driving coils in accordance with the detected phase difference;

a driver circuit operable to drive said first and second driving coils with the driving pulse;

a counter circuit operable to count the number of driving pulses; and computing means for computing a force or acceleration applied to said moving member based on the number counted by said counter circuit.

2. A displacement sensor according to claim 1, wherein the driving electric power is computed based on the number of driving pulses.

3. A displacement sensor according to claim 1, wherein said computing means computes the force applied to said moving member per axis by using an equation of $F=K1 \cdot N1 - K2 \cdot N2$, where F represents the force, N1, N2 represent count numbers of the first and second driving pulses, respectively, supplied to said first and second driving coils, respectively, on one axis and K1, K2 represent force coefficients.

4. A displacement sensor according to claim 3, wherein said control unit includes a temperature sensor and makes a correction of the computation of said computing means based on a temperature detection output of said temperature sensor.

5. A displacement sensor according to claim 1, wherein said computing means computes the acceleration applied to said moving member per axis using an equation of $G=K10 \cdot N1 - K20 \cdot N2$, where G represents the acceleration, N1, N2 represent count numbers of the first and second driving pulses, respectively, supplied to said first and second driving coils, respectively, on one axis and K10, K20 represent acceleration coefficients.

6. A displacement sensor according to claim 5, wherein said control unit includes a temperature sensor and makes a correction of the computation of said computing means based on a temperature detection output of said temperature sensor.

7. A displacement sensor according to claim 1, wherein said first and second position detectors are converters utilizing variations in inductance or in electrostatic capacity.

* * * * *